(12) United States Patent
Hasegawa et al.

(10) Patent No.: US 8,814,638 B2
(45) Date of Patent: Aug. 26, 2014

(54) VARIABLE DUCT APPARATUS

(75) Inventors: Masami Hasegawa, Tokyo (JP);
Hiroyuki Yoshimoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 942 days.

(21) Appl. No.: 12/923,886

(22) Filed: Oct. 13, 2010

(65) Prior Publication Data

US 2011/0097984 A1     Apr. 28, 2011

(30) Foreign Application Priority Data

Oct. 26, 2009   (JP) .................................. 2009-245107

(51) Int. Cl.
  *B60H 1/00*          (2006.01)
(52) U.S. Cl.
  USPC ......................................... 454/75; 123/41.05
(58) Field of Classification Search
  USPC ................................ 454/152; 123/41.05, 4.05
  See application file for complete search history.

(56) References Cited

U.S. PATENT DOCUMENTS

| | | | | |
|---|---|---|---|---|
| 1,570,111 | A | * | 1/1926 | Wickware ....................... 49/77.1 |
| 1,619,621 | A | * | 3/1927 | Lovejoy ........................... 165/98 |
| 4,457,558 | A | * | 7/1984 | Ishikawa .................... 296/180.5 |
| 6,286,893 | B1 | * | 9/2001 | Presley ....................... 296/180.5 |
| 6,588,380 | B2 | * | 7/2003 | Ries-Mueller ............. 123/41.05 |
| 2009/0050385 | A1 | * | 2/2009 | Guilfoyle et al. ............ 180/68.1 |

FOREIGN PATENT DOCUMENTS

| | | | |
|---|---|---|---|
| JP | 62017313 A | * | 1/1987 |
| JP | 5-58172 A | | 3/1993 |
| JP | 2007-320527 A | | 12/2007 |

* cited by examiner

*Primary Examiner* — Steven B McAllister
*Assistant Examiner* — Brittany Towns
(74) *Attorney, Agent, or Firm* — McGinn IP Law Group, PLLC

(57) ABSTRACT

A variable duct apparatus that controls outside air flowing in to a radiator includes a variable louver that is provided so as to extend in the vehicle width direction between a grille opening and a radiator of a vehicle, and regulates the amount of outside air admitted to the radiator, a lower louver that is provided so as to extend in the vehicle width direction between an air inlet and the radiator, and regulates the amount of outside air admitted to the radiator, and a link mechanism that coordinates and synchronizes the variable louver and the lower louver with each other, and interrupts the coordination between the variable louver and the lower louver upon application of an external force to the lower louver to thereby permit swinging of the lower louver.

11 Claims, 12 Drawing Sheets

VARIABLE DUCT APPARATUS

CROSS-REFERENCE TO RELATED APPLICATIONS

The present application claims priority from Japanese Patent Application No. 2009-245107 filed on Oct. 26, 2009, and is hereby incorporated by reference in its entirety.

BACKGROUND OF THE INVENTION

1. Field of the Invention

The present invention relates to a variable duct apparatus, in particular, a variable duct apparatus provided between each of a bumper and an upper opening, and a radiator in a vehicle.

2. Description of the Related Art

Generally, a bumper and a front grille arranged on the front side portion of a vehicle are each provided with an opening that admits outside air to the front side of each of a radiator and a cooler condenser installed in an engine room. The outside air admitted from such openings is used to cool the engine coolant in the radiator, and also to cool the cooler condenser. However, there is concern that during high-speed running or the like, running resistance will become greater as the amount of outside air admitted into the engine room from the opening in each of the bumper and the front grille increases, causing a decrease in fuel efficiency. Also, it is feared that the engine will be cooled excessively in winter or cold climate areas. Further, there is concern that in winter or cold climate areas, the warming-up performance of the engine or the catalytic activity of an exhaust gas purifier will be affected.

Accordingly, a technique exists in which a variable duct apparatus is provided in each of these openings, and the amount of outside air to be admitted is regulated by opening and closing the duct in accordance with the vehicle speed, the temperature of the engine coolant, or the engine load state, thereby preventing excessive cooling of the engine and a deterioration in fuel efficiency due to an increase in running resistance caused by an increase in the amount of outside air admitted into the engine room from the opening in the bumper or the front grille.

Japanese Unexamined Patent Application Publication No. 1993-58172 proposes a variable-duct controller which is provided between an opening formed in each of a bumper and a front grille, and a radiator. This variable-duct controller includes a first variable louver provided in the opening formed in the front grille, and a second variable louver provided in the opening formed in the bumper. In accordance with the engine load state, controls of the opening and closing of the first variable louver and the second variable louver are executed independently by separate actuators.

Japanese Unexamined Patent Application Publication No. 2007-320527 proposes a variable duct apparatus that controls a variable louver provided between an opening formed in a bumper and a radiator, and a movable shutter provided between an opening formed in a front grille and the radiator. The variable duct apparatus disclosed in Japanese Unexamined Patent Application Publication No. 2007-320527 mentioned above will be described with reference to FIG. 12.

As illustrated in the drawing, a vehicle 110 includes a bumper 103 in which an air inlet 104 is formed. Above the bumper 103, a front grille 101 in which a grille opening 101a is formed is disposed along the bumper 103. A radiator 106 is arranged opposed to the grille opening 101a and the air inlet 104.

The variable duct apparatus 100 includes a shutter mechanism 102 provided between the grille opening 101a and the radiator 106 and formed by a plurality of flat shutter plates 102a. In the air inlet 104, there are provided baffle plates 105 extending in the vehicle width direction and formed in a wing-like shape that curves while gradually decreasing in thickness toward the vehicle's rearward direction R as viewed in cross-section taken along the front-rear direction of the vehicle indicated by an arrow FR. The shutter plates 102a and the baffle plates 105 are controlled so as to be movable by separate motors in accordance with the outside temperature or the battery's water temperature, thereby executing admission and blocking of outside air to the radiator 106.

According to Japanese Unexamined Patent Application Publication No. 1993-58172 mentioned above, there is concern that since the swing motions of the first variable louver and second variable louver are controlled independently by separate actuators, an increase in manufacturing cost and weight will occur. Also, there is concern that when a vehicle equipped with such a variable duct controller runs on a flooded road, if the opening in the bumper is blocked by the second variable louver, excessive water pressure will be applied to the second variable louver during running of the vehicle, causing damage to the second variable louver. Furthermore, there is concern that when the second variable louver freezes in a cold climate area or the like, engine performance will be affected by the resulting cooling failure or the like.

According to Japanese Unexamined Patent Application Publication No. 2007-320527 mentioned above, there is concern that since actuations of the shutter mechanism 102 and baffle plates 105 are controlled independently by separate actuators, an increase in manufacturing cost and weight will occur as in the case of Japanese Unexamined Patent Application Publication No. 1993-58172. Likewise, there is concern that when the vehicle runs on a flooded road, if the air inlet 104 is blocked by the baffle plates 105, excessive water pressure will be applied to the baffle plates 105 during running of the vehicle, causing damage to the baffle plates 105. Furthermore, there is concern that when the baffle plates 105 freeze in a cold climate area or the like, engine performance will be affected by the resulting cooling failure or the like.

SUMMARY OF THE INVENTION

Accordingly, to address the above-mentioned problems, it is an object of the present invention to provide a variable duct apparatus which has a variable louver provided in an opening in a front grille and a lower louver provided in an opening in a bumper to be coordinated with each other, and interrupts the coordination between the variable louver and the lower louver when an external force is applied to the lower louver to thereby prevent damage to the lower louver.

According to a first aspect of the present invention, there is provided a variable duct apparatus which is arranged between each of a bumper and an upper opening, and a radiator in a vehicle to control outside air flowing in to the radiator, the bumper being divided via a lower opening into a bumper upper portion extending in a vehicle width direction and a bumper lower portion extending in the vehicle width direction along and below the bumper upper portion, the upper opening being arranged above the bumper and formed above and along the bumper upper portion, the upper opening and the radiator being arranged opposed to each other, the variable duct apparatus including a variable louver provided so as to extend in the vehicle width direction between the upper opening and the radiator, the variable louver swinging between the upper opening and the radiator so as to block or allow communication between the upper opening and the radiator to control an amount of the outside air admitted to the radiator, a lower louver provided so as to extend in the vehicle width direction between the lower opening and the radiator, the lower louver swinging between the lower opening and the radiator so as to block or allow communication between the lower opening and the radiator to control an amount of the outside air admitted to the radiator, and a link mechanism that coordinates and synchronizes the blocking or allowing of communication between the upper opening and the radiator and between the lower opening and the radiator by the variable louver and the lower louver, respectively, and upon application of an external force to the lower louver in a state where communication between the lower opening and the radiator has been blocked by swinging of the lower louver, causes the coordination between the variable louver and the lower louver to be interrupted by swinging of the lower louver to permit swinging of the lower louver.

According to the above-mentioned aspect of the present invention, the variable louver and the lower louver can be easily coordinated with each other by the link mechanism. Therefore, the number of members can be reduced to achieve a reduction in manufacturing cost and a reduction in weight. Furthermore, the swing motions of the variable louver and the lower louver can be coordinated and synchronized with each other in accordance with the vehicle's running state.

On the other hand, when an external force is applied to the lower louver in a state where communication between the lower opening and the radiator is blocked by swinging of the lower louver, the coordination between the variable louver and the lower louver is interrupted by the link mechanism to permit swinging of the lower louver, thereby avoiding a situation where the lower louver and the lower link are damaged by the external force applied to the lower louver.

According to a second aspect of the present invention, there is provided a variable duct apparatus which is arranged between each of a bumper and an upper opening, and a radiator in a vehicle to control outside air flowing in to the radiator, the bumper being divided via a lower opening into a bumper upper portion extending in a vehicle width direction and a bumper lower portion extending in the vehicle width direction along and below the bumper upper portion, the upper opening being arranged above the bumper and formed above and along the bumper upper portion, the upper opening and the radiator being arranged opposed to each other, the variable duct apparatus including a variable louver provided so as to extend in the vehicle width direction between the upper opening and the radiator, the variable louver swinging between the upper opening and the radiator so as to block or allow communication between the upper opening and the radiator to control an amount of the outside air admitted to the radiator, a lower louver provided so as to extend in the vehicle width direction between the lower opening and the radiator, the lower louver swinging between the lower opening and the radiator so as to block or allow communication between the lower opening and the radiator to control an amount of the outside air admitted to the radiator, and a link mechanism that coordinates and synchronizes the blocking or allowing of communication between the upper opening and the radiator and between the lower opening and the radiator by the variable louver and the lower louver, respectively, and interrupts the coordination between the variable louver and the lower louver when the lower louver becomes inoperative due to an external force in a state where communication between the lower opening and the radiator has been blocked by swinging of the lower louver.

According to the above-mentioned aspect of the present invention, the variable louver and the lower louver can be easily coordinated with each other by the link mechanism. Therefore, the number of members can be reduced to achieve a reduction in manufacturing cost and a reduction in weight. Furthermore, the swing motions of the variable louver and the lower louver can be coordinated and synchronized with each other in accordance with the vehicle's running state.

On the other hand, when the lower louver becomes inoperative due to an external force in a state where communication between the lower opening and the radiator is blocked by swinging of the lower louver, the coordination between the variable louver and the lower louver is interrupted by the link mechanism, thereby ensuring independent operation of the variable louver.

According to a third aspect of the present invention, in the variable duct apparatus according to the first aspect, the link mechanism includes an upper link connected to the variable louver and a lower link connected to the lower louver, and a link base portion connected with the upper link at one end and connected with the lower link at the other end, the lower link includes a lower link bracket mounted to the other end of the link base portion, the lower link bracket having a general surface extending in a rearward direction of the vehicle, and a guide portion including a fitting portion formed so as to be recessed toward a forward direction of the vehicle from an end portion of the general surface, a first guide piece having a first slanting portion extending continuously from an upper portion of the fitting portion so as to slant upwards, and a second guide piece having a second slanting portion extending continuously from a lower portion of the fitting portion so as to slant downwards away from the first guide piece, and a lower link arm having an upper portion that is engaged with the guide portion and fitted in the fitting portion, and a lower portion connected to the lower louver, the lower link arm being urged in the forward direction of the vehicle, and upon application of an external force to the lower louver in a state where communication between the lower opening and the radiator has been blocked by swinging of the lower louver, the fitting between the fitting portion of the lower link bracket and the lower link arm is released by driving of the link base portion, causing the lower link arm to shift in the rearward direction of the vehicle along the first guide piece.

The above-mentioned aspect of the present invention clarifies details of the link mechanism and the lower link according to the first aspect more specifically. In a state where communication between the lower opening and the radiator is blocked by swinging of the lower louver, when an external force is applied to the lower louver, and the fitting between the fitting portion of the lower link bracket and the lower link arm is released, the coordination between the variable louver and the lower louver is interrupted, causing the lower link arm to shift in the vehicle's rearward direction along the first guide piece. Therefore, by means of a simple structure, swinging of the lower louver when an external force is applied to the lower louver is achieved in a smooth fashion.

According to a fourth aspect of the present invention, in the variable duct apparatus according to the second aspect, the link mechanism includes an upper link connected to the variable louver and a lower link connected to the lower louver, and a link base portion connected with the upper link at one end and connected with the lower link at the other end, the lower link includes a lower link bracket mounted to the other end of the link base portion, the lower link bracket having a general surface extending in a rearward direction of the vehicle, and a guide portion including a fitting portion formed so as to be recessed toward a forward direction of the vehicle from an end portion of the general surface, a first guide piece having a first slanting portion extending continuously from an upper portion of the fitting portion so as to slant upwards, and a second guide piece having a second slanting portion extending continuously from a lower portion of the fitting portion so as to slant downwards away from the first guide piece, and a lower link arm having an upper portion that is engaged with the guide portion and fitted in the fitting portion, and a lower portion connected to the lower louver, the lower link arm being urged in the forward direction of the vehicle, and when the lower louver becomes inoperative due to an external force in a state where communication between the lower opening and the radiator is blocked by swinging of the lower louver, the fitting between the fitting portion of the lower link bracket and the lower link arm is released by driving of the link base portion, causing the lower link arm to shift in the rearward direction of the vehicle along the second guide piece.

The above-mentioned aspect of the present invention clarifies details of the lower link bracket according to the second aspect more specifically. In a state where communication between the lower opening and the radiator is blocked by swinging of the lower louver, when the lower louver becomes inoperative due to an external force, and the fitting between the fitting portion of the lower link bracket and the lower link arm is released, the coordination between the variable louver and the lower louver is interrupted, causing the lower link arm to shift in the vehicle's rearward direction along the second guide piece. Therefore, by means of a simple structure, swinging of the lower louver when an external force is applied to the lower louver is achieved in a smooth fashion.

According to a fifth aspect of the present invention, in the variable duct apparatus according to the first aspect, the link mechanism includes an engaging portion having a fitting portion in a recessed shape formed at an upper end on a rearward side of the vehicle in the lower louver, a lower rotary link member having a lower rotary link main body portion extending in a front-rear direction of the vehicle and pivotally supported on the vehicle, a fitting shaft portion that is formed in a lower portion on a forward side of the vehicle in the lower rotary link main body portion, and fits in the fitting portion of the engaging portion, a rod engaging hole bored on the rearward side of the vehicle in the lower rotary link main body portion, and a water receiving portion provided upright from the lower rotary link main body portion, urging means for urging the lower rotary link member in a downward direction of the vehicle, and a rod having a distal end inserted into the rod engaging hole, and a proximal end connected to the variable louver, and upon application of an external force to the water receiving portion in a state where communication between the lower opening and the radiator has been blocked by swinging of the lower louver, the fitting between the fitting shaft portion of the lower rotary link member and the fitting portion of the lower louver is released, and the coordination between the variable louver and the lower louver is interrupted to permit swinging of the lower louver.

According to the above-mentioned aspect of the present invention, the variable louver and the lower louver can be easily coordinated with each other by the link mechanism. Therefore, the number of members can be reduced to achieve a reduction in manufacturing cost and a reduction in weight. Furthermore, the swing motions of the variable louver and the lower louver can be coordinated and synchronized with each other in accordance with the vehicle's running state.

On the other hand, in a state where communication between the lower opening and the radiator is blocked by swinging of the lower louver, when an external force is applied to the water receiving portion, and the fitting between the lower louver and the lower rotary link member is released, the coordination between the variable louver and the lower louver is interrupted to permit swinging of the lower louver, thereby avoiding a situation where the lower louver and the lower link are damaged by the external force applied to the lower louver.

According to a sixth aspect of the present invention, in the variable duct apparatus according to the third or fourth aspect, the link base portion is rotated in a vertical direction of the vehicle, and a drive force caused by the rotation is transmitted to each of the upper link and the lower link.

According to the above-mentioned aspect of the present invention, the link base portion is rotated in the vertical direction of the vehicle, and the drive force caused by the rotation is transmitted to each of the upper link and the lower link, thereby realizing opening and closing of the variable louver and the lower louver. Therefore, a variable duct apparatus can be obtained while ensuring the stability of operation by means of a simple operation, thereby making it possible to cut down the number of members and manufacturing cost.

BRIEF DESCRIPTION OF THE DRAWINGS

FIG. 7 is a view illustrating an outline of operation of the variable duct apparatus according to this embodiment during running of a vehicle on a flooded road or the like;

FIG. 11 is a view illustrating an outline of operation of the variable duct apparatus according to this embodiment during running of a vehicle on a flooded road or the like.

DESCRIPTION OF THE PREFERRED EMBODIMENTS

First Embodiment

Figure 1:
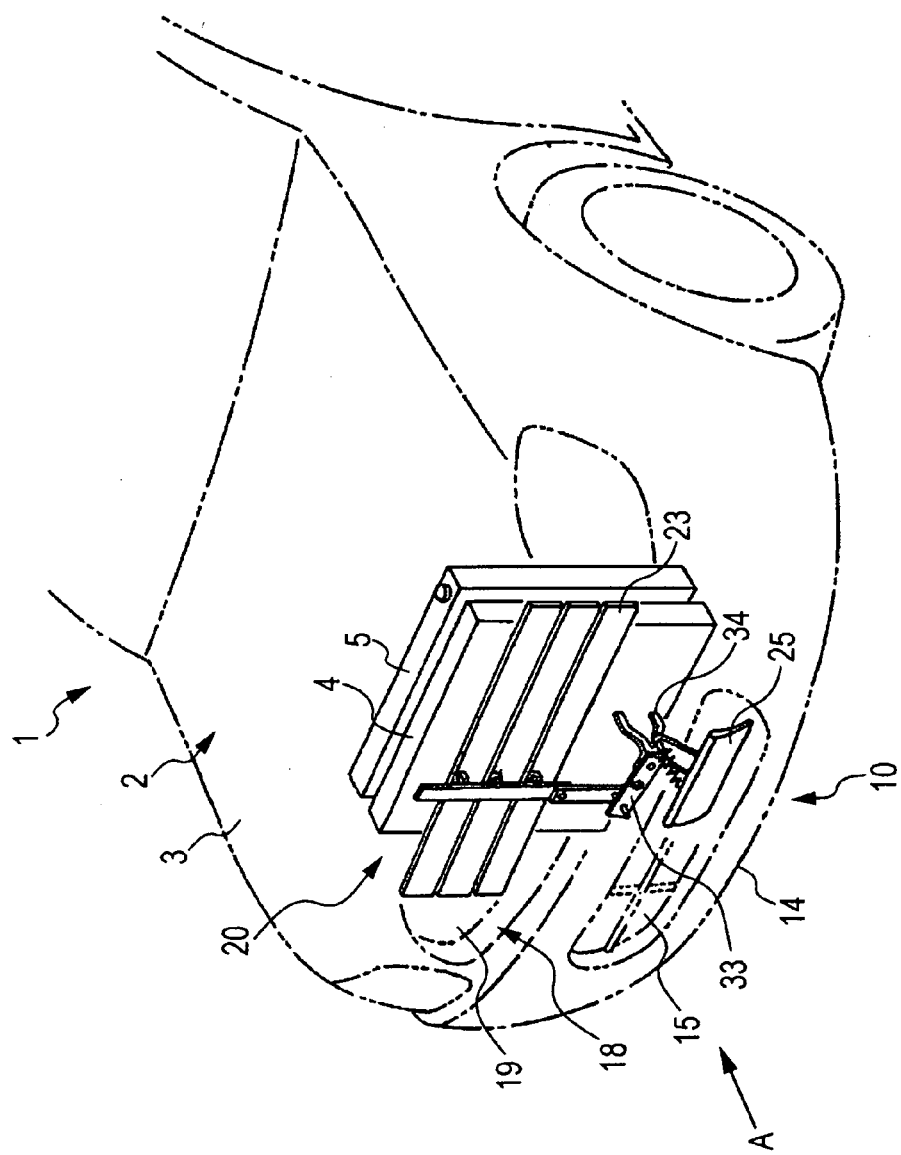
FIG. 1 is a perspective view of the front portion of a vehicle equipped with a variable duct apparatus according to a first embodiment of the present invention.
Figure 2:
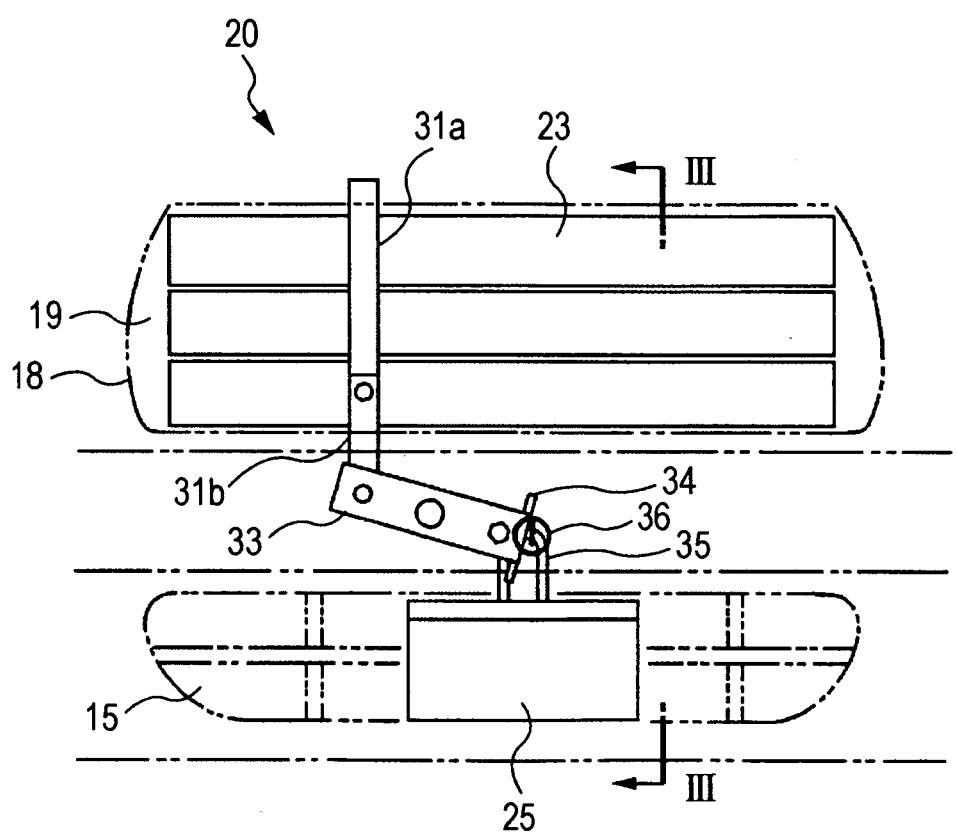
FIG. 2 is a view taken in the direction of an arrow A in FIG. 1.

Next, a first embodiment of the present invention will be described in detail with reference to FIGS. 1 to 7. FIG. 1 is a perspective view of the front portion of a vehicle equipped with a variable duct apparatus according to this embodiment. FIG. 2 is a view taken in the direction of an arrow A in FIG. 1.

Figure 3:
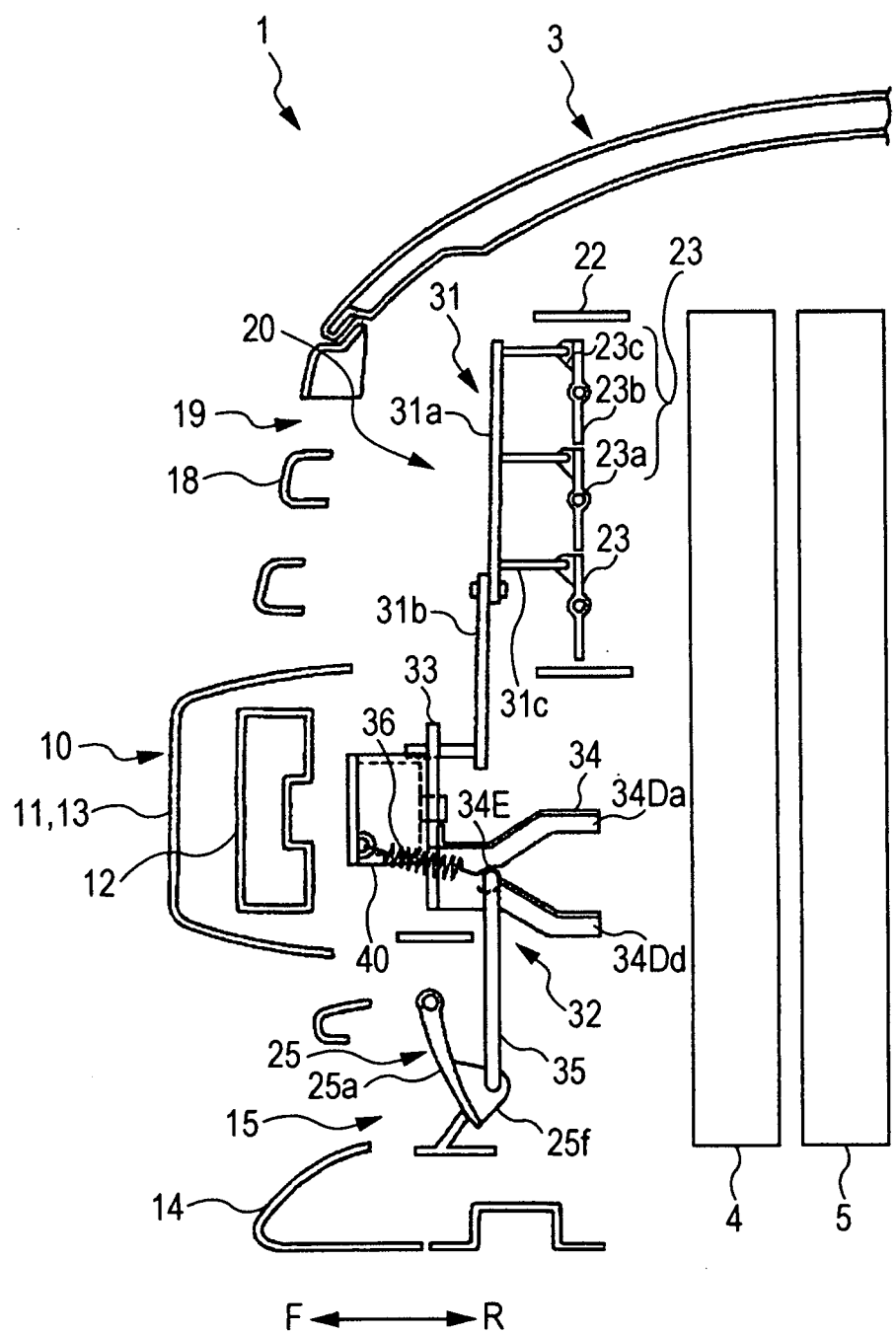
FIG. 3 is a cross-sectional view taken along a line III-III of FIG. 2.
Figure 4:
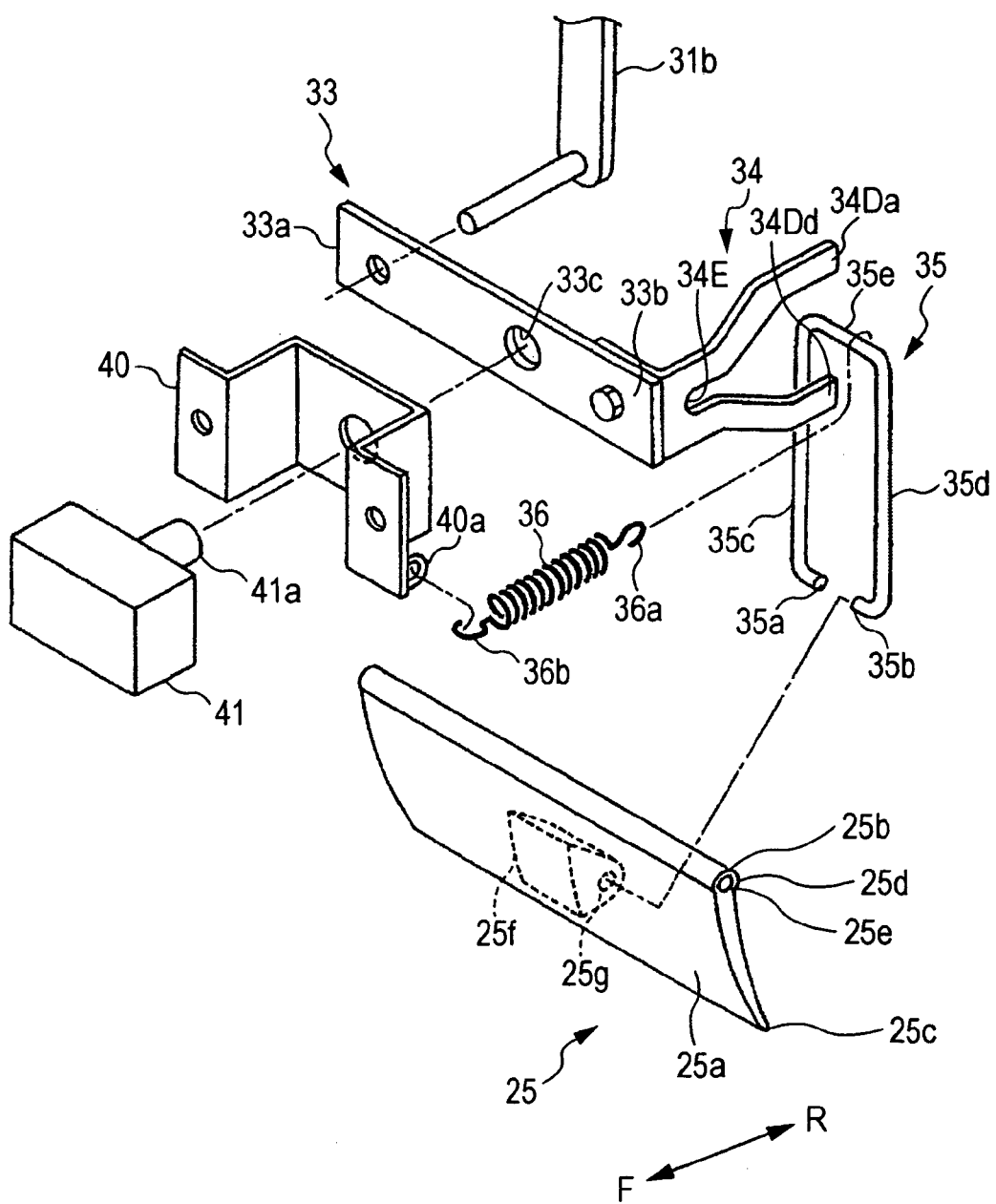
FIG. 4 is an exploded perspective view similarly illustrating an outline of the structure of a lower link in the variable duct apparatus according to this embodiment.
Figure 5:
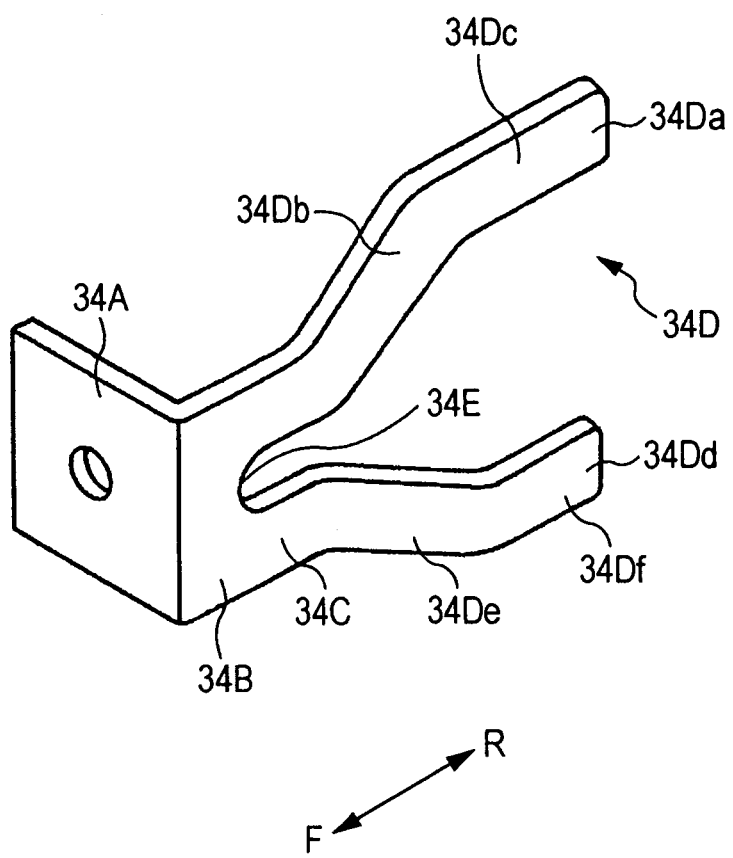
FIG. 5 is a view similarly illustrating an outline of a lower link bracket in the variable duct apparatus according to this embodiment.

FIG. 3 is a cross-sectional view taken along a line III-III of FIG. 2. FIG. 4 is an exploded perspective view illustrating an outline of the structure of a lower link in the variable duct apparatus. FIG. 5 is a view illustrating an outline of a lower link bracket. In the drawings, an arrow F indicates the vehicle's forward direction, and an arrow R indicates the vehicle's rearward direction.

As illustrated in the drawings, an engine compartment 2 is formed at the front portion of the vehicle 1, and the engine compartment 2 is covered by a hood 3 at the top in such a way as to allow its opening and closing. In the interior of the engine compartment 2, a cooler condenser 4 and a radiator 5 are mounted via a bracket or the like to a radiator upper panel and a radiator lower panel (not shown) which extend in the vehicle width direction.

A bumper 10 extending in the vehicle width direction is arranged in a lower part of the front portion of the vehicle 1, and a front grille 18 extending in the vehicle width direction is arranged in an upper part of the front portion of the vehicle 1.

The bumper 10 includes a bumper upper portion 11 and a bumper lower portion 14 arranged below the bumper upper portion 11. The bumper upper portion 11 includes a bumper beam 12 extending in the vehicle width direction and supported on a vehicle body frame (not shown). A bumper face 13 made of resin is mounted to the front side of the bumper beam 12 via an impact absorber (not shown). The bumper lower portion 14 is formed by an impact absorbing member (not shown) interposed between the radiator lower panel and the bumper face 13. The height dimension of the bumper lower portion 14 in the vertical direction is smaller than the height dimension of the bumper upper portion 11 in the vertical direction, and the front end of the bumper lower portion 14 is located more rearward in the vehicle than the front end of the bumper upper portion 11. In the event of a light collision, the impact load is absorbed by the bumper upper portion 11 that projects more forward than the bumper lower portion 14. An air inlet 15 serving as the lower opening is formed between the bumper upper portion 11 and the bumper lower portion 14.

The front grille 18 is formed between the bumper upper portion 11 and the front end of the hood 3, and has a grille opening 19 having a decorative function and serving as the upper opening that admits outside air.

A variable duct apparatus 20 that controls outside air flowing in to the radiator 5 is disposed between the bumper 10 and the front grille 18, and the radiator 5.

Next, the variable duct apparatus 20 will be described.

The variable duct apparatus 20 has stationary louvers 22 and variable louvers 23 provided between the grille opening 19 of the front grille 18 and the radiator 5, and a lower louver 25 provided between the air inlet 15 of the bumper 10 and the radiator 5. The variable louvers 23 and the lower louver 25 are connected to each other by a link mechanism 30.

The stationary louvers 22 are flat and formed in a substantially rectangular shape so as to extend in the vehicle width direction, and are supported in a stationary fashion at the upper end and lower end of the grille opening 19. A plurality of movable louvers 23, which in this embodiment are three movable louvers 23, are disposed between the stationary louver 22 that is arranged at the upper end between the grille opening 19 and the radiator 5, and the stationary louver 22 that is arranged at the lower end.

The variable louvers 23 each include a blocking surface 23b. Like the stationary louvers 22, the blocking surface 23b are flat and formed in a substantially rectangular shape so as to extend in the vehicle width direction. A rotating shaft 23a is inserted into an insertion hole formed so as to extend through each of the variable louvers 23 in the vehicle width direction from the substantially central portion along the direction of the short side of the blocking surface 23b. The variable louvers 23 are each supported on the rotating shaft 23a so as to be rotatable with respect to the stationary louver 22. A plate-shaped drive receiving portion 23c is formed so as to project from one side of the blocking surface 23b. In this embodiment, the blocking surface 23b and the drive receiving portion 23c are formed integrally to constitute each of the variable louvers 23. The variable louvers 23 described above swing between the grille opening 19 and the radiator 5 to block or allow communication between the grille opening 19 and the radiator 5, thereby adjusting the amount of outside air admitted to the radiator 5 from the grille opening 19.

The lower louver 25 includes a blocking surface 25a. The blocking surface 25a has a proximal end 25b arranged on the side toward the upper portion of the vehicle 1, and a distal end 25c arranged on the side toward the lower portion of the vehicle 1. The blocking surface 25a has a wing-shaped cross-section that curves while gradually decreasing in thickness from the proximal end 25b toward the distal end 25c. The blocking surface 25a is formed with such a cross-sectional shape extending along the vehicle width direction. A hinge 25d having an insertion hole that extends through the lower louver 25 in the vehicle width direction is formed at the proximal end 25b. A rotating shaft 25e is inserted into the insertion hole of the hinge 25d. The lower louver 25 is pivotally supported on a vehicle body member (not shown) by the rotating shaft 25e.

A lower-link-arm engaging portion 25f formed like a substantially chevron-shaped column in cross-section is formed so as to project from the distal end 25c side of the curved inner side of the blocking surface 25a. Engaging holes 25g for engagement with a lower link arm 35 described later are bored in opposite side surfaces of the lower-link-arm engaging portion 25f. In this embodiment, the blocking surface 25a and the lower-link-arm engaging portion 25f are formed integrally to constitute the lower louver 25. The lower louver 25 described above opens and closes between the air inlet 15 and the radiator 5, thereby blocking or allowing communication between the air inlet 15 and the radiator 5 to adjust the amount of outside air admitted to the radiator 5.

The link mechanism 30 includes an upper link 31 and lower link 32, and a link base portion 33 that connects and drives these links together. The link base portion 33 is formed in a flat, substantially rectangular shape having one end 33a and the other end 33b. A fitting hole 33c is formed at substantially the central portion of the link base portion 33. A rotating shaft 41a of an actuator 41 is fitted into the fitting hole 33c. The link base portion 33 is mounted to the vehicle body member (not shown) via a mounting bracket 40 having a hat-shaped cross-section to which the actuator 41 is mounted.

The upper link 31 includes an upper first rod 31a and an upper second rod 31b formed in a rod-like shape and extending in the vertical direction on the side of the vehicle's forward direction F with respect to each of the variable louvers 23. A drive shaft 31c connected to the drive receiving portion 23c of each of the variable louvers 23 is formed on the upper first rod 31a. The upper part of the upper second rod 31b is pivoted on the lower part of the upper first rod 31a, and the lower part of the upper second rod 31b is rotatably mounted to the one end 33a of the link base portion 33.

The lower link 32 includes a lower link bracket 34, a lower link arm 35, and a spring 36. The lower link bracket 34 has a mounting portion 34A that is opposed to the link base portion 33 and mounted to the other end 33b of the link base portion 33, a general surface 34B that is bent and extends in the vehicle's rearward direction R from the mounting portion 34A, and a guide portion 34D that branches off up and down from an end portion 34C of the general surface 34B and extends in the vehicle's rearward direction R so as to have a substantially Y-shape in side view.

The guide portion 34D includes a fitting portion 34E, and a first guide piece 34Da having a first slanting portion 34Db and a first flat portion 34Dc. The fitting portion 34E is formed so as to be recessed toward the vehicle's forward direction F from substantially the central portion in the vertical direction at the end portion 34C of the general surface 34B. The first slanting portion 34Db slants upwards continuously from the upper portion of the fitting portion 34E and extends toward the vehicle's rearward direction R. The first flat portion 34Dc is bent and extends toward the vehicle's rearward direction R from the first slanting portion 34Db. In addition, the guide portion 34D includes a second guide piece 34Dd having a second slanting portion 34De and a second flat portion 34Df. The second slanting portion 34De slants and extends downwards continuously from the lower portion of the fitting portion 34E so as to gradually move away from the first guide piece 34Da. The second flat portion 34Df is bent and extends toward the vehicle's rearward direction R from the second slanting portion 34De.

The lower link arm 35 is formed by a rod-like member, and has a linear upper portion 35e capable of engagement with the fitting portion 34E of the lower link bracket 34 and extending in the vehicle width direction. In addition, the lower link arm 35 has side portions 35c and 35d that are bent downwards from the opposite ends of the upper portion 35e and extend while being opposed to each other. End portions 35a and 35b are respectively bent from the side portions 35c and 35d in a direction toward each other, thus forming a substantially rectangular shape in plan view that is open at the lower portion with the end portions 35a and 35b opposed to each other at a predetermined spacing.

The upper portion 35e of the lower link arm 35 fits in the fitting portion 34E of the lower link bracket 34, and the end portions 35a and 35b of the lower link arm 35 are engaged with the engaging holes 25g bored in the opposite side surfaces of the lower-link-arm engaging portion 25f of the lower louver 25. Furthermore, one end 36a of the spring 36 engages with the upper portion 35e of the lower link arm 35, the other end 36b of the spring 36 engages with a spring engaging portion 40a of the mounting bracket 40, and the lower link arm 35 is urged toward the vehicle's forward direction F so that the upper portion 35e of the lower link arm 35 is engaged with and held by the fitting portion 34E, thereby forming the lower link 32.

Next, a description will be given of operation of the variable duct apparatus 20 according to this embodiment with reference to FIGS. 3, 6 and 7.

As shown in FIG. 3, when admission of outside air is not required for the vehicle 1 during high-speed running, low-load running, or the like, for example, communication between the grille opening 19 and the radiator 5 and communication between the air inlet 15 and the radiator 5 are both blocked in order to block admission of outside air to the radiator 5. That is, in this embodiment, in the state when the grille opening 19 and the radiator 5 communicate with each other and the air inlet 15 and the radiator 5 communicate with each other, the actuator 41 is allowed to move, causing the one end 33a side and the other end 33b side of the link base portion 33 of the link mechanism 30 to rotate upwards and downwards, respectively. Then, the drive force produced by this rotation is sequentially transmitted to the upper second rod 31b and upper first rod 31a of the upper link 31 connected to the one end 33a side, causing these rods to move upwards. The variable louvers 23 are each caused to swing about the drive receiving portion 23c by the drive shaft 31c formed on the upper first rod 31a and connected to the drive receiving portion 23c of each of the variable louvers 23, thereby blocking communication between the grille opening 19 and the radiator 5.

Also, the drive force produced by the rotation of the link base portion 33 is transmitted to the lower link bracket 34 of the lower link 32 connected to the other end 33b side. Consequently, the lower louver 25 connected via the lower link arm 35 that fits in the fitting portion 34E of the lower link bracket 34 is pushed downwards from the distal end 25c side and caused to swing about the hinge 25d, thereby blocking communication between the air inlet 15 and the radiator 5.

Figure 6:
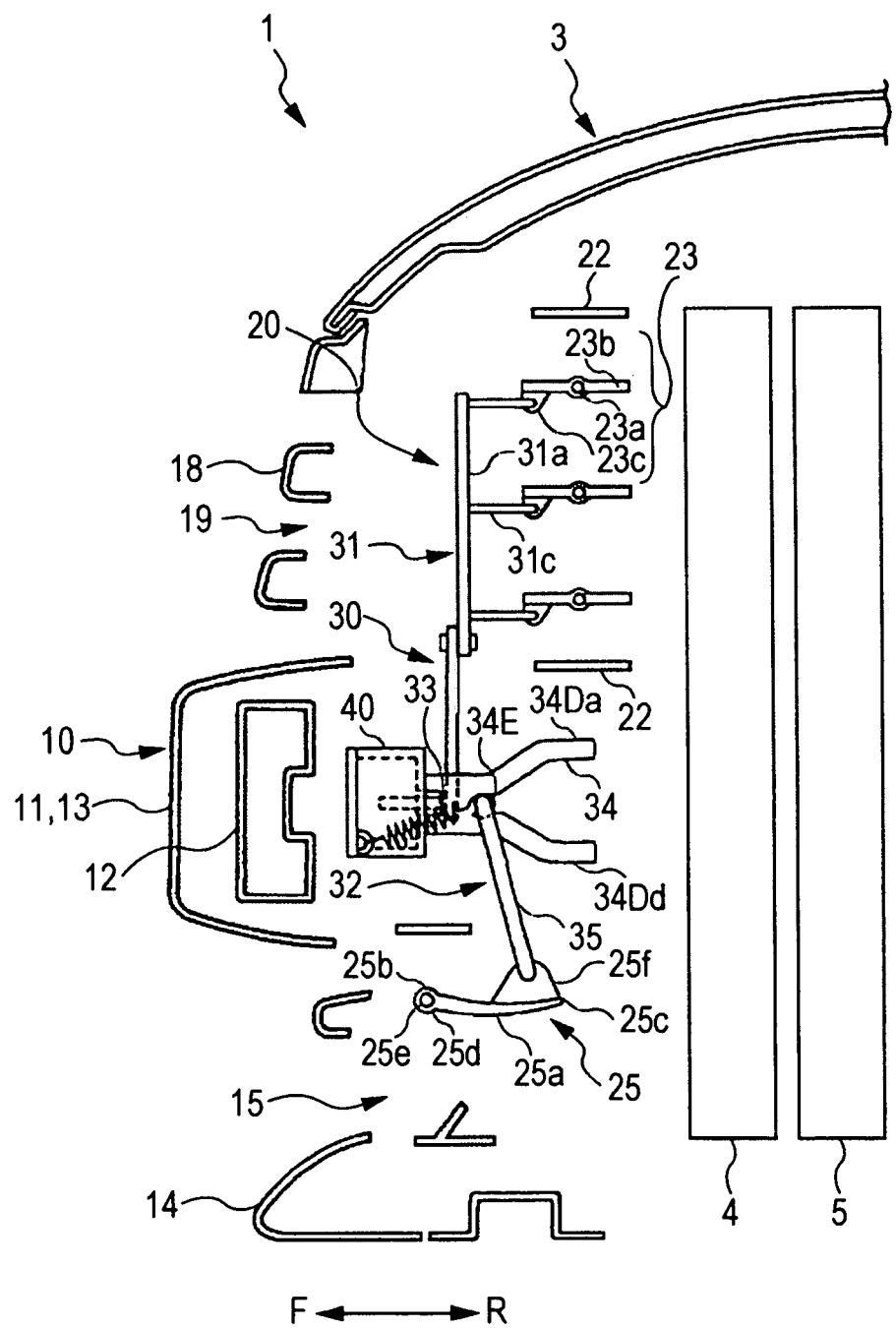
FIG. 6 is a view illustrating an outline of operation of the variable duct apparatus according to this embodiment when admission of outside air is required.

On the other hand, when admission of outside air is required during high-temperature engine combustion or the like, as shown in FIG. 6, the grille opening 19 and the radiator 5, and the air inlet 15 and the radiator 5 are both caused to communicate with each other in a synchronized fashion so as to admit outside air to the radiator 5 from the air inlet 15 formed in the bumper 10 and from the grille opening 19 formed in the front grille 18. That is, in this embodiment, in the state when communication between the grille opening 19 and the radiator 5 and communication between the air inlet 15 and the radiator 5 are blocked, the actuator 41 is allowed to move, causing the one end 33a side and the other end 33b side of the link base portion 33 of the link mechanism 30 to rotate downwards and upwards, respectively. Then, the drive force produced by this rotation is sequentially transmitted to the upper second rod 31b and upper first rod 31a of the upper link 31 connected to the one end 33a side, causing these rods to move downwards. The variable louvers 23 are each caused to swing about the drive receiving portion 23c by the drive shaft 31c formed on the upper first rod 31a and connected to the drive receiving portion 23c of each of the variable louvers 23, thereby allowing communication between the grille opening 19 and the radiator 5.

Also, the drive force produced by the rotation of the link base portion 33 is transmitted to the lower link bracket 34 of the lower link 32 connected to the other end 33b side. Consequently, the lower louver 25 connected via the lower link arm 35 that fits in the fitting portion 34E of the lower link bracket 34 is pulsed upwards from the distal end 25c side and caused to swing about the hinge 25d, thereby allowing communication between the air inlet 15 and the radiator 5.

Next, a description will be given of operation of the variable duct apparatus 20 when the vehicle 1 shifts to running on a flooded road.

Figure 7:
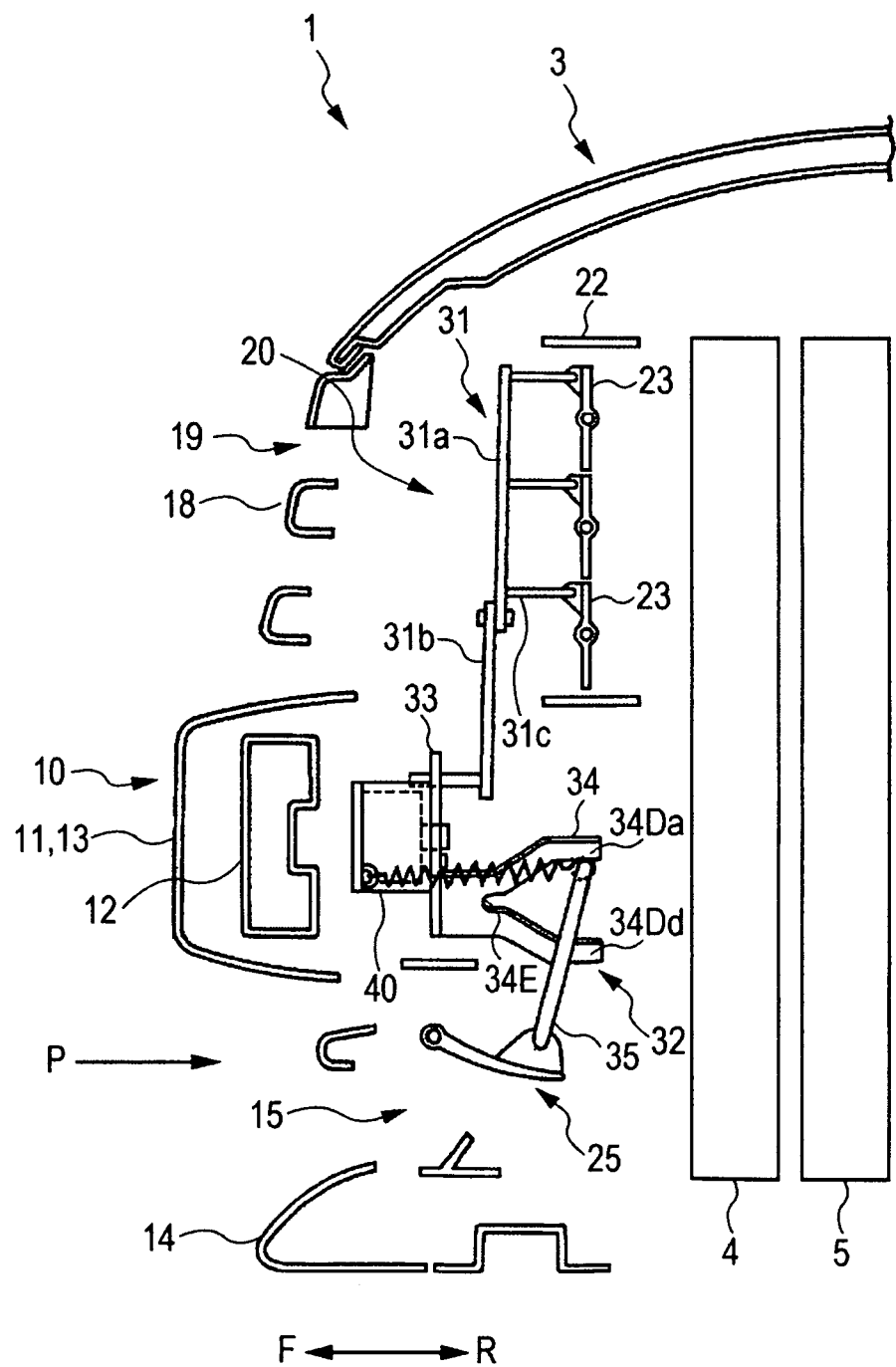

In the state when the lower louver 25 has swung to block communication between the air inlet 15 and the radiator 5, as the vehicle 1 shifts to running on a flooded road, as shown in FIG. 7, an external force is applied, that is, scattered water enters through the air inlet 15 of the bumper 10, causing water pressure P to be input to the lower louver 25. Consequently, the lower louver 25 is pushed upwards from the distal end 25c side, and also the lower link arm 35 is pushed upwards. Thus, the upper portion 35e of the lower link arm 35 fitted in the fitting portion 34E of the lower link bracket 34 is pushed out from the fitting portion 34E, thereby releasing the fitting between the upper portion 35e and the fitting portion 34E. The upper portion 35e of the lower link arm 35 thus shifts toward the vehicle's rearward direction R along the first guide piece 34Da of the lower link bracket 34, against the urging force applied by the spring 36 in the vehicle's forward direction F. This causes the lower louver 25 to swing about the hinge 25d to allow communication between the air inlet 15 and the radiator 5, and the scattered water enters the engine compartment 2.

At this time, the drive force applied to the lower louver 25 by the water pressure P is intercepted as the fitting between the lower link arm 35 and the lower link bracket 34 is released. Thus, the drive force due to the water pressure P is not transmitted to the link base portion 33. Therefore, since no drive force is applied to the variable louvers 23 as well, the communication between the grille opening 19 and the radiator 5 remains blocked.

On the other hand, as the vehicle 1 shifts to running on a flooded road in the state when the grille opening 19 and the radiator 5, and the air inlet 15 and the radiator 5 are both caused to communicate with each other, since the air inlet 15 and the radiator 5 communicate with each other, scattered water enters the engine compartment 2.

Next, a description will be given of operation of the variable duct apparatus 20 when the lower louver 25 freezes.

For example, if the lower louver 25 of the vehicle 1 becomes inoperative due to an external force, that is, if the lower louver 25 freezes in the state where communication between the grille opening 19 and the radiator 5 and communication between the air inlet 15 and the radiator 5 are both blocked in a synchronized fashion, when the engine becomes a high-temperature combustion state or the like and the actuator 41 is allowed to move, the one end 33a side and the other end 33b side of the link base portion 33 of the link mechanism 30 rotate downwards and upwards, respectively. This allows communication between the grille opening 19 and the radiator 5.

Also, the rotation of the link base portion 33 is transmitted to the lower link bracket 34, and the fitting of the upper portion 35e of the lower link arm 35 in the fitting portion 34E of the lower link bracket 34 is released, causing the lower link arm 35 to shift toward the vehicle's rearward direction R along the second guide piece 34Db of the lower link bracket 34, against the urging force applied by the spring 36 in the vehicle's forward direction F. At this time, since the lower louver 25 is frozen, communication between the air inlet 15 and the radiator 5 remains blocked.

With the above-described structure, the link base portion 33 of the link mechanism 30 is rotated by a single actuator 41, and the drive force due to the rotation is transmitted to the upper link 31 and the lower link 32, so the variable louvers 23 and the lower louver 25 operate in coordination with each other. That is, when admission of outside air is required during high-temperature engine combustion or the like, the variable louvers 23 and the lower louver 25 both swing to allow communication between the grille opening 19 and the radiator 5 and communication between the air inlet 15 and the radiator 5, respectively. When admission of outside air is not required for the vehicle 1, the variable louvers 23 and the lower louver 25 both swing to block communication between the grille opening 19 and the radiator 5 and communication between the air inlet 15 and the radiator 5, respectively. Therefore, by means of a simple structure in which the upper link 31 and the lower link 32 are connected to the link base portion 33, the number of members is reduced to achieve a reduction in manufacturing cost and a reduction in weight, and furthermore, when admission of outside air is required, outside air can be efficiently admitted from the grille opening 19 and the air inlet 15 to cool the cooler condenser 4 and the engine coolant in the radiator 5. Also, when admission of outside air is not required, admission of outside air from the grille opening 19 and the air inlet 15 can be reliably blocked to prevent excessive cooling of the engine, and also a reduction in fuel efficiency due to an increase in running resistance can be prevented.

On the other hand, when the vehicle 1 shifts to running on a flooded road, water pressure P due to scattered water or the like causes the lower louver 25 to swing, and the drive force applied to the lower louver 25 by the water pressure P is intercepted as the fitting between the lower link arm 35 and the lower link bracket 34 is released, that is, the coordination between the variable louvers 23 and the lower louver 25 is interrupted, so the communication between the grille opening 19 and the radiator 5 remains blocked. Therefore, the lower louver 25 is caused to swing independently from the variable louvers 23, thus avoiding a situation where the lower louver 25 and the lower link 32 are damaged due to the input of the water pressure P.

If the portion of the lower louver 25 freezes in the state where communication between the grille opening 19 and the radiator 5 and communication between the air inlet 15 and the radiator 5 are blocked, when the engine burns at high temperature, the grille opening 19 and the radiator 5 are caused to communicate with each other. On the other hand, even when the inoperative state of the lower louver 25 is maintained due to freezing, the fitting between the lower link bracket 34 and the lower link arm 35 is released by the rotation of the link base portion 33, causing the lower link arm 35 to shift toward the vehicle's rearward direction R along the second guide piece 34Db of the lower link bracket 34. Therefore, when the lower louver 25 is inoperative, the coordination between the variable louvers 23 and the lower louver 25 is interrupted, thereby ensuring independent operation of the variable louvers 23.

Furthermore, coordination between the variable louvers 23 and the lower louver 25 and interruption of the coordination can be realized by means of a simple mechanical structure, and the link mechanism 30 can be moved by the single actuator 41. It is thus possible to cut down manufacturing cost, and also reduce the weight of the vehicle 1 and the risk of failure.

Second Embodiment

Figure 8:
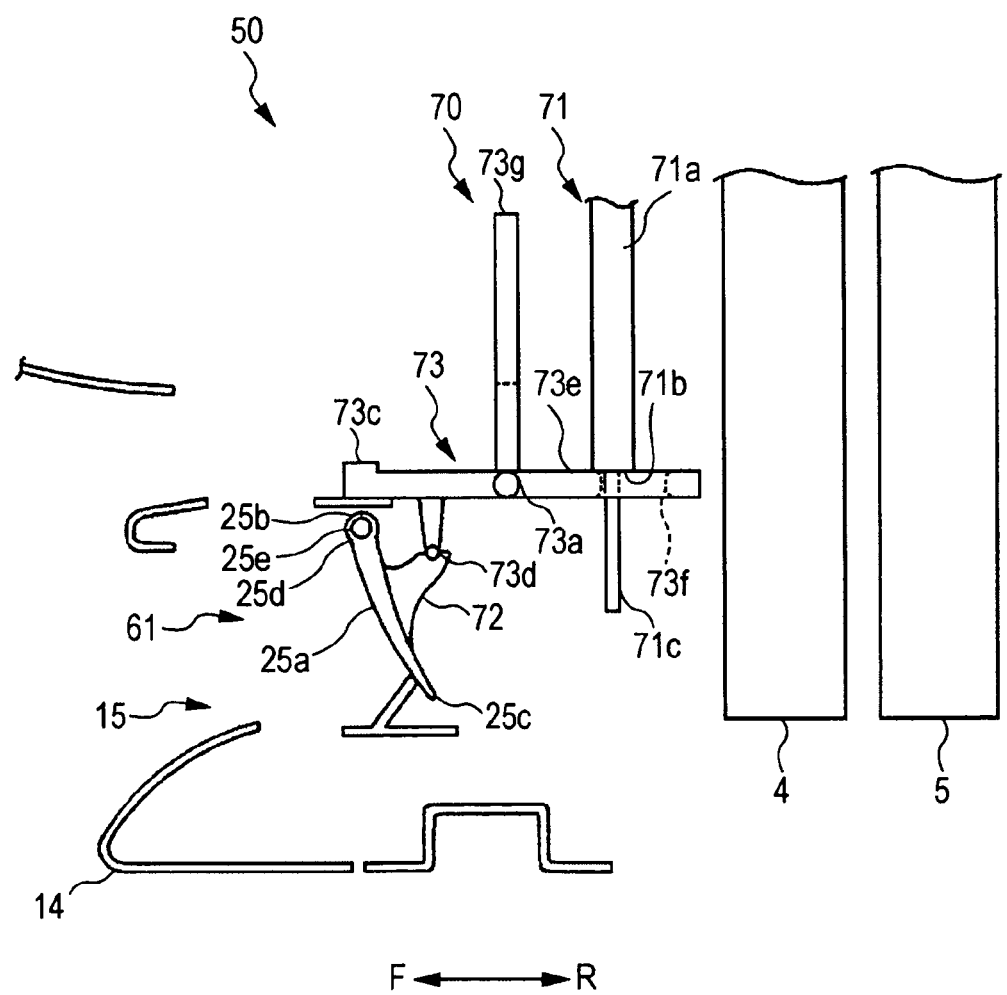
FIG. 8 is a view illustrating an outline of the lower portion of a variable duct apparatus according to a second embodiment of the present invention.
Figure 9:
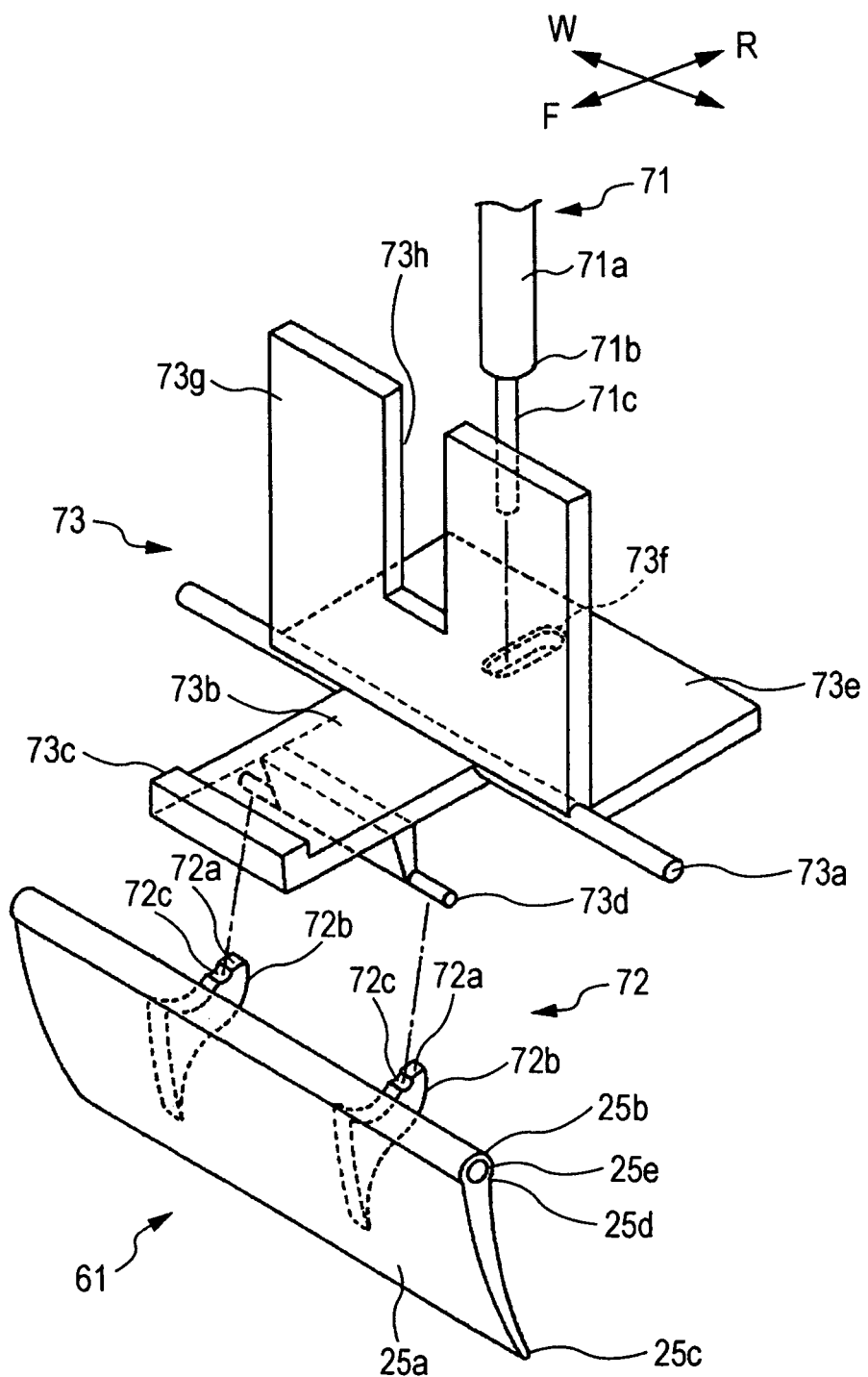
FIG. 9 is an exploded perspective view similarly illustrating a schematic of the structure of a lower link in the variable duct apparatus according to this embodiment.

Next, a second embodiment of the present invention will be described in detail with reference to FIGS. 8 to 11. FIG. 8 is a view illustrating an outline of the lower portion of a variable duct apparatus 50 according to the second embodiment. FIG. 9 is an exploded structural view of the lower portion of the variable duct apparatus 50. In the drawings, an arrow F indicates the vehicle's forward direction, and an arrow R indicates the vehicle's rearward direction. In FIGS. 8 and 9, elements that are the same as those in FIGS. 1 to 7 are denoted by the same symbols, and a detailed description of those elements is omitted.

As shown in FIG. 8, in the lower portion of the variable duct apparatus 50, there is provided a lower louver 61 having the blocking surface 25a between the air inlet 15 of the bumper 10 and the radiator 5. The blocking surface 25a of the lower louver 61 is of the same structure as the blocking surface 25a of the lower louver 25 according to the first embodiment. The lower louver 61 is disposed in the vehicle body member in the same placement as the lower louver 25, and is connected by a link mechanism 70. The lower louver 61 described above swings between the air inlet 15 and the radiator 5 to block or allow communication between the air inlet 15 and the radiator 5, thereby adjusting the amount of outside air admitted to the radiator 5 from the air inlet 15.

The link mechanism 70 includes a rod 71, an engaging portion 72 formed in the lower louver 61, and a lower rotary link member 73.

The rod 71 has a rod main body portion 71a formed in a rod-like shape, and a distal end portion 71c formed with a small diameter relative to the rod main body portion 71a and in a rod-like shape so as to extend from an end portion 71b of the rod main body portion 71a. A drive shaft (not shown) connected to the drive receiving portion 23c of each of the variable louvers 23 (not shown in FIG. 8) is formed at an upper portion of the rod 71 serving as the proximal end.

As shown in FIG. 9, the engaging portion 72 is formed by arranging two plate-like members on the side of the vehicle's rearward direction of the lower louver 61, oppose to each other. The two plate-like members each have an upper edge 72a and a side edge 72b and are formed in a substantially strip shape in side view. A fitting portion 72c having a substantially recessed shape in side view is formed at substantially the central portion of the upper edge 72a of each of the two plate-like members constituting the engaging portion 72. It should be noted that in this embodiment, the engaging portion 72 is formed integrally with the lower louver 61.

As shown in FIG. 9, the lower rotary link member 73 has a rotating shaft 73a, a lower-rotary-link-main-body first surface 73b, a weight 73c, a fitting shaft portion 73d, a lower-rotary-link-main-body second surface 73e, a lower rod engaging hole 73f, and a water receiving portion 73g, and is formed in a substantially T shape in side view. The rotating shaft 73a has a hollow cylindrical shape and extends in the vehicle body width direction W. The lower-rotary-link-main-body first surface 73b is formed in a flat shape extending toward the vehicle's forward direction F from the rotating shaft 73a. The weight 73c serves as urging means that extends in the vehicle body width direction W and formed in a substantially cubic shape at the distal end of the lower-rotary-link-main-body first surface 73b. The fitting shaft portion 73d has a cylindrical shape and formed at the distal end of an extended portion that extends in the vehicle body width direction W on the lower side of the lower-rotary-link-main-body first surface 73b and projects downwards from this lower side. The lower-rotary-link-main-body second surface 73e extends toward the vehicle's rearward direction R from the rotating shaft 73a and is formed in a flat shape. The lower rod engaging hole 73f is bored in the lower-rotary-link-main-body second surface 73e and formed as an elongated hole by being chamfered at the edges. The water receiving portion 73g is provided upright from the rotating shaft 73a orthogonally to the lower-rotary-link-main-body first surface 73b and the lower-rotary-link-main-body second surface 73e, and has a rod guide 73h formed by cutting out the substantially central portion in the vehicle body width direction W of the upper edge into a rectangular shape.

The drive shaft formed at the upper portion of the rod 71 is connected to the drive receiving portion 23c of each of the variable louvers 23, and the lower rotary link member 73 is rotatably pivoted on a vehicle body member (not shown) by the rotating shaft 73a. On the other hand, the drive shaft (not shown) formed at the upper portion of the rod 71 is connected to the drive receiving portion 23c of each of the variable louvers 23, and the distal end portion 71c of the rod 71 is inserted into the lower rod engaging hole 73f bored in the lower-rotary-link-main-body second surface 73e of the lower rotary link member 73, causing the end portion 71b of the rod main body portion 71a to abut on the lower-rotary-link-main-body second surface 73e. In this state, the fitting shaft portion 73b of the lower rotary link member 73 fits in the fitting portion 72c formed in the engaging portion 72, and the lower rotary link member 73 is urged downwards by the weight 73c formed at the distal end of the lower rotary link member 73, thereby forming the link mechanism 70.

Next, a description will be given of operation of the variable duct apparatus 50 according to this embodiment with reference to FIGS. 8, 10, and 11.

Figure 10:
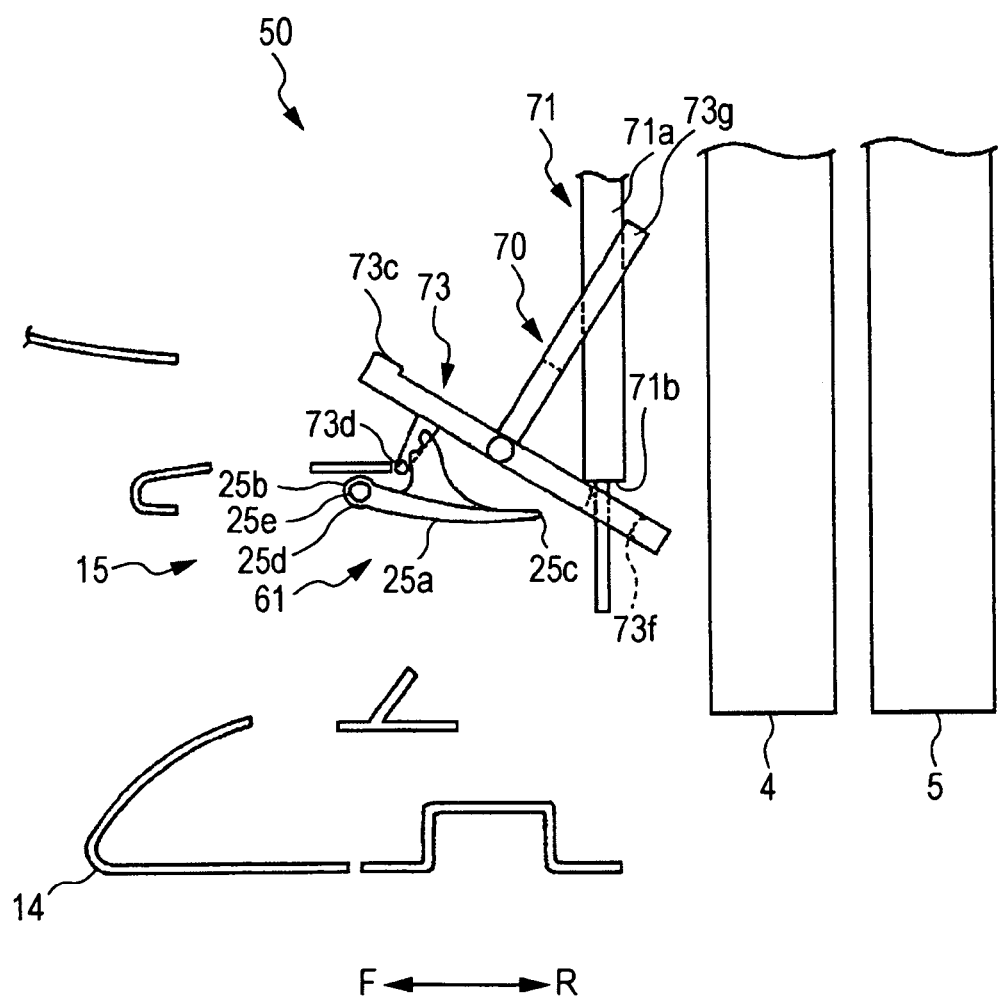
FIG. 10 is a view illustrating an outline of operation of the variable duct apparatus according to this embodiment when admission of outside air is required.

As shown in FIG. 10, when admission of outside air is required during high-temperature engine combustion or the like, the grille opening 19 and the radiator 5, and the air inlet 15 and the radiator 5 are both caused to communicate with each other in a synchronized fashion so as to admit outside air to the radiator 5 from the air inlet 15 formed in the bumper 10 and from the grille opening 19 formed in the front grille 18. That is, in this embodiment, in the state when communication between the grille opening 19 and the radiator 5 and communication between the air inlet 15 and the radiator 5 are blocked, as an actuator (not shown) is allowed to move, the rod 71 descends. This causes the grille opening 19 and the radiator 5 to communicate with each other.

Also, in the state when the end portion 71b of the rod main body portion 71a abuts on the lower-link-main-body second surface 73e due to the descending of the rod 71, the rod 71 is pushed downwards, causing the lower rotary link member 73 to rotate upwards from the weight 73c side about the rotating shaft 73a. This releases the fitting between the fitting shaft portion 73d and the fitting portion 72c, allowing the lower louver 61 to swing freely. The lower louver 61 thus swings due to the running air produced by running of the vehicle 1, causing the air inlet 15 and the radiator 5 to communicate with each other.

On the other hand, when admission of outside air is not required, as shown in FIG. 8, communication between the grille opening 19 and the radiator 5 and communication between the air inlet 15 and the radiator 5 are both blocked in a synchronized fashion in order to block admission of outside air to the radiator 5. That is, in this embodiment, as the actuator is allowed to move, the rod 71 ascends, and each of the variable louvers 23 is caused to swing about the drive receiving portion 23c by the drive shaft 31c formed on the rod 71 and connected to the drive receiving portion 23c of each of the variable louvers 23, thereby blocking communication between the grille opening 19 and the radiator 5.

Also, following the ascent of the rod 71, the lower rotary link member 73 rotates downwards from the weight 73c side about the rotating shaft 73a due to the self weight of the weight 73c of the lower rotary link member 73. Thus, the fitting shaft portion 73d fits in the fitting portion 72c, causing the lower louver 61 to stop in closing position, thereby blocking communication between the air inlet 15 and the radiator 5.

Next, a description will be given of operation of the variable duct apparatus 50 when the vehicle 1 shifts to running on a flooded road.

Figure 11:
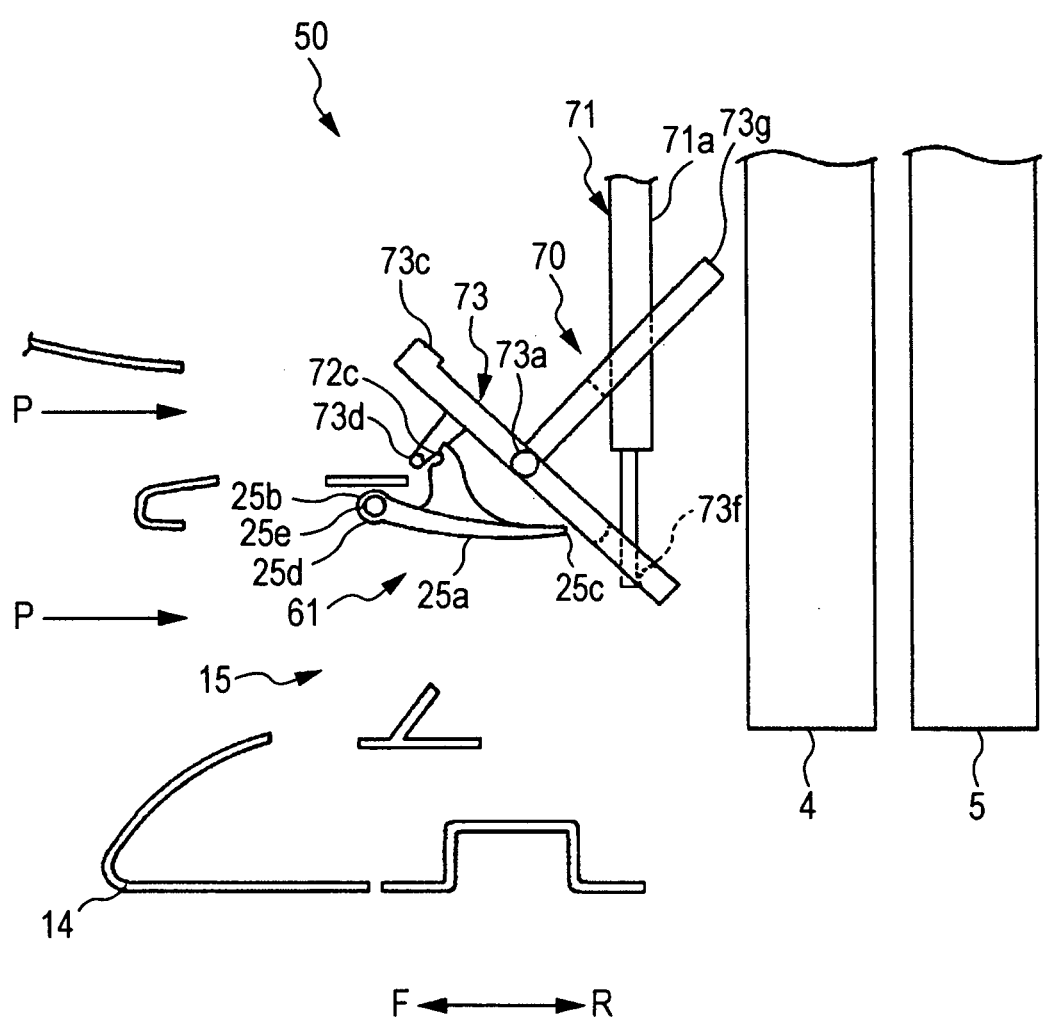
Figure 12:
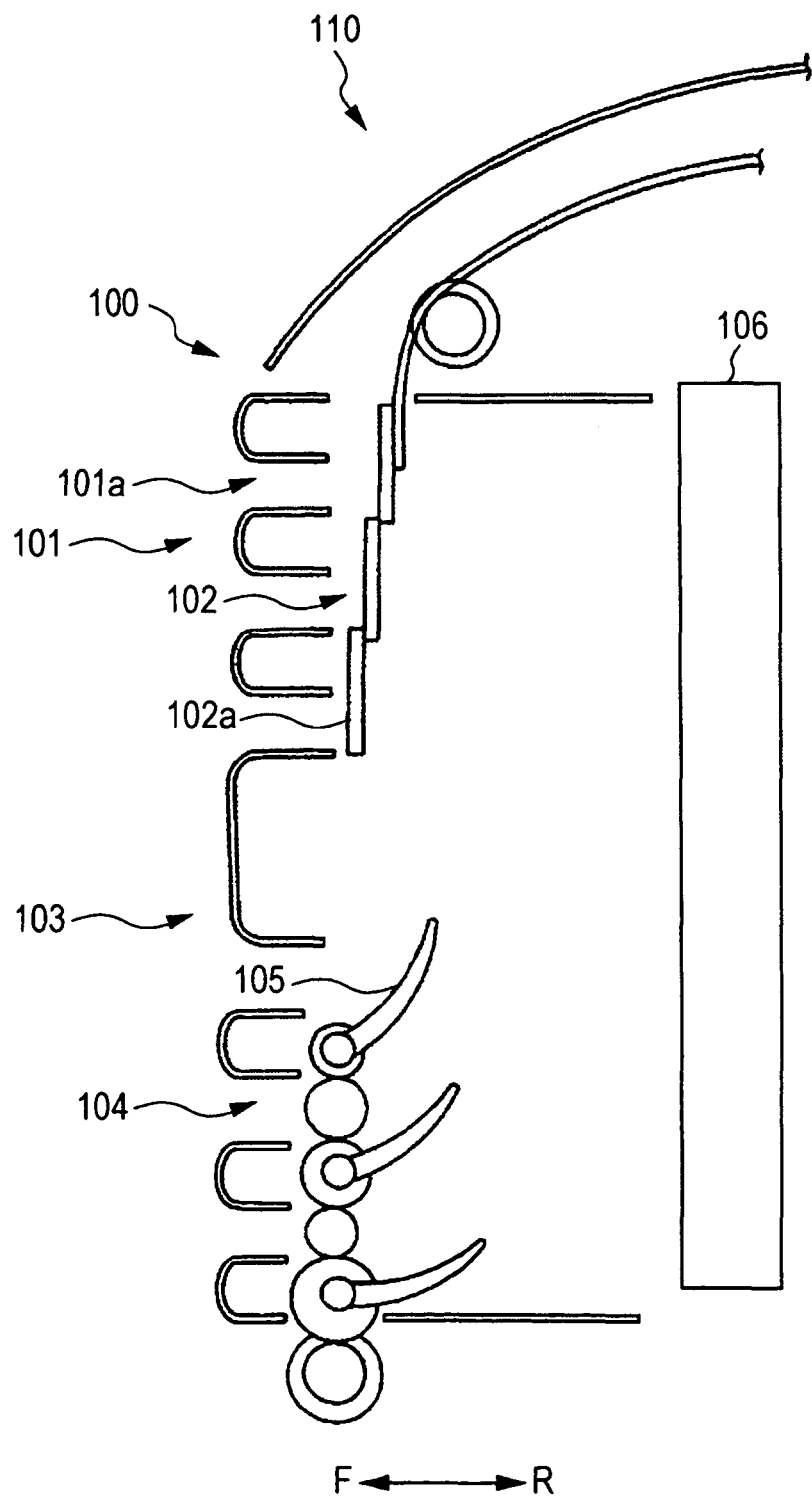
FIG. 12 is a view illustrating an outline of a variable duct apparatus according to the related art.

When the vehicle 1 shifts to running on a flooded road in the state where the lower louver 61 stops in closing position to block communication between the air inlet 15 and the radiator 5, as shown in FIG. 11, an external force is applied, that is, scattered water enters through the air inlet 15 of the bumper 10, causing water pressure P to be inputted to the water receiving portion 73g of the lower rotary link member 73. Consequently, the lower rotary link member 73 rotates upwards from the weight 73c side about the rotating shaft 73a. This releases the fitting between the fitting shaft portion 73d and the fitting portion 72c, allowing the lower louver 61 to swing freely. Therefore, when water enters through the air inlet 15, the lower louver 61 is caused to swing toward the vehicle's rearward direction R, thus permitting entrance of water into the engine compartment 2.

On the other hand, when the vehicle 1 shifts to running on a flooded road in the state where the grille opening 19 and the radiator 5, and the air inlet 15 and the radiator 5 are both caused to communicate with each other, since the air inlet 15 and the radiator 5 communicate with each other, water is permitted to enter the engine compartment 2.

With the above-described structure, when admission of outside air is required during high-temperature engine combustion or the like, fitting between the fitting shaft portion 73c of the lower rotary link member 73 and the engaging portion 72 is released to allow the lower louver 61 to freely swing. Thus, the lower louver 61 swings due to running air produced by running of the vehicle 1, and the air inlet 15 and the radiator 5 are caused to communicate with each other, thereby permitting entrance of outside air from the air inlet 15. Therefore, when admission of outside air is required, outside air can be efficiently admitted from the grille opening 19 and the air inlet 15 to cool the cooler condenser 4 and the engine coolant in the radiator 5. Also, when admission of outside air is not required, communication between the grille opening 19 and the radiator 5 is blocked, and the fitting shaft portion 73d of the lower rotary link member 73 fits in the fitting portion 72c of the engaging portion 72, causing the lower louver 61 to stop in closing position for the air inlet 15. Thus, admission of outside air from the grille opening 19 and the air inlet 15 can be blocked with reliability to prevent excessive cooling of the engine, and also a reduction in fuel efficiency due to an increase in running resistance can be prevented.

On the other hand, when the vehicle 1 shifts to running on a flooded road, fitting between the fitting shaft portion 73d of the lower rotary link member 73 and the engaging portion 72 is released by the water pressure P applied to the water receiving portion 73g, allowing the lower louver 61 to swing freely independently from the variable louvers 23. Therefore, entrance of water into the vehicle 1 is permitted, thus avoiding a situation where the lower louver 61 and the lower link 71 are damaged due to the input of the water pressure P.

It is to be understood that the present invention is not limited to the above-mentioned embodiments, but various modifications are possible without departing from the scope of the present invention. For example, while the second embodiment mentioned above is directed to the case in which the means for urging the lower rotary link member 73 downwards is formed by the weight 73c formed at the distal end of the lower rotary link member 73, such urging may be performed by a spring provided under tension between the lower rotary link member 73 and the vehicle body member.

What is claimed is:

1. A variable duct apparatus which is arranged between each of a bumper and an upper opening, and a radiator in a vehicle to control outside air flowing in to the radiator, the bumper being divided via a lower opening into a bumper upper portion extending in a vehicle width direction and a bumper lower portion extending in the vehicle width direction along and below the bumper upper portion, the upper opening being arranged above the bumper and formed above and along the bumper upper portion, the upper opening and the radiator being arranged opposed to each other, comprising:

a variable louver provided so as to extend in the vehicle width direction between the upper opening and the radiator, the variable louver swinging between the upper opening and the radiator so as to block or allow communication between the upper opening and the radiator to control an amount of the outside air admitted to the radiator;

a lower louver provided so as to extend in the vehicle width direction between the lower opening and the radiator, the lower louver includes a blocking surface which has a wing-shaped cross-section that curves while gradually decreasing in thickness from a proximal end toward a distal end, and the lower louver swinging between the lower opening and the radiator so as to block or allow communication between the lower opening and the radiator to control an amount of the outside air admitted to the radiator; and a link mechanism that coordinates and synchronizes the blocking or allowing of communication between the upper opening and the radiator and between the lower opening and the radiator by the variable louver and the lower louver, respectively, and the link mechanism includes:

an upper link connected to the variable louver and a lower link connected to the lower louver, and a link base portion connected with the upper link at one end and connected with the lower link at the other end;

the lower link includes:

a lower link bracket mounted to the other end of the link base portion, the lower link bracket having:

a general surface extending in a rearward direction of the vehicle, and a guide portion including:

a fitting portion formed so as to be recessed toward a forward direction of the vehicle from an end portion of the general surface, a first guide piece having a first slanting portion extending continuously from an upper portion of the fitting portion so as to slant upwards, and a second guide piece having a second slanting portion extending continuously from a lower portion of the fitting portion so as to slant downwards away from the first guide piece, and a lower link arm having an upper portion that is engaged with the guide portion and fitted in the fitting portion, and a lower portion connected to the lower louver, the lower link arm being urged in the forward direction of the vehicle; and upon application of an external force to the lower louver in a state where communication between the lower opening and the radiator has been blocked by swinging of the lower louver, the fitting between the fitting portion of the lower link bracket and the lower link arm is released by driving of the link base portion, causing the lower link arm to shift in the rearward direction of the vehicle along the first guide piece.

2. A variable duct apparatus which is arranged between each of a bumper and an upper opening, and a radiator in a vehicle to control outside air flowing in to the radiator, the bumper being divided via a lower opening into a bumper upper portion extending in a vehicle width direction and a bumper lower portion extending in the vehicle width direction along and below the bumper upper portion, the upper opening being arranged above the bumper and formed above and along the bumper upper portion, the upper opening and the radiator being arranged opposed to each other, comprising:

a variable louver provided so as to extend in the vehicle width direction between the upper opening and the radiator, the variable louver swinging between the upper opening and the radiator so as to block or allow communication between the upper opening and the radiator to control an amount of the outside air admitted to the radiator;

a lower louver provided so as to extend in the vehicle width direction between the lower opening and the radiator, the lower louver includes a blocking surface which has a wing-shaped cross-section that curves while gradually decreasing in thickness from a proximal end toward a distal end, and the lower louver swinging between the lower opening and the radiator so as to block or allow communication between the lower opening and the radiator to control an amount of the outside air admitted to the radiator; and a link mechanism that coordinates and synchronizes the blocking or allowing of communication between the upper opening and the radiator and between the lower opening and the radiator by the variable louver and the lower louver, respectively, and the link mechanism includes:
an upper link connected to the variable louver and a lower link connected to the lower louver, and
a link base portion connected with the upper link at one end and connected with the lower link at the other end;

the lower link includes:
a lower link bracket mounted to the other end of the link base portion, the lower link bracket having:
a general surface extending in a rearward direction of the vehicle, and
a guide portion including:
a fitting portion formed so as to be recessed toward a forward direction of the vehicle from an end portion of the general surface,
a first guide piece having a first slanting portion extending continuously from an upper portion of the fitting portion so as to slant upwards, and
a second guide piece having a second slanting portion extending continuously from a lower portion of the fitting portion as to slant downwards away from the first guide piece, and
a lower link arm having an upper portion that is engaged with the guide portion and fitted in the fitting portion, and a lower portion connected to the lower louver, the lower link arm being urged in the forward direction of the vehicle; and
when the lower louver becomes inoperative due to an external force in a state where communication between the lower opening and the radiator is blocked by swinging of the lower louver, the fitting between the fitting portion of the lower link bracket and the lower link arm is released by driving of the link base portion, causing the lower link arm to shift in the rearward direction of the vehicle along the second guide piece.

3. A variable duct apparatus which is arranged between each of a bumper and an upper opening, and a radiator in a vehicle to control outside air flowing in to the radiator, the bumper being divided via a lower opening into a bumper upper portion extending in a vehicle width direction and a bumper lower portion extending in the vehicle width direction along and below the bumper upper portion, the upper opening being arranged above the bumper and formed above and along the bumper upper portion, the upper opening and the radiator being arranged opposed to each other, comprising:

a variable louver provided so as to extend in the vehicle width direction between the upper opening and the radiator, the variable louver swinging between the upper opening and the radiator so as to block or allow communication between the upper opening and the radiator to control an amount of the outside air admitted to the radiator;

a lower louver provided so as to extend in the vehicle width direction between the lower opening and the radiator, the lower louver includes a blocking surface which has a wing-shaped cross-section that curves while gradually decreasing in thickness from a proximal end toward a distal end, and the lower louver swinging between the lower opening and the radiator so as to block or allow communication between the lower opening and the radiator to control an amount of the outside air admitted to the radiator; and a link mechanism that coordinates and synchronizes the blocking or allowing of communication between the upper opening and the radiator and between the lower opening and the radiator by the variable louver and the lower louver, respectively, and the link mechanism includes:
an engaging portion having a fitting portion in a recessed shape formed at an upper end on a rearward side of the vehicle in the lower louver,
a lower rotary link member having:
a lower rotary link main body portion extending in a front-rear direction of the vehicle and rotatably pivoted on the vehicle,
a fitting shaft portion that is formed in a lower portion on a forward side of the vehicle in the lower rotary link main body portion, and fits in the fitting portion of the engaging portion,
a rod engaging hole bored on the rearward side of the vehicle in the lower rotary link main body portion, and
a water receiving portion provided upright from the lower rotary link main body portion,
urging means for urging the lower rotary link member in a downward direction of the vehicle, and
a rod having a distal end inserted into the rod engaging hole, and a proximal end connected to the variable louver; and
upon application of an external force to the water receiving portion in a state where communication between the lower opening and the radiator has been blocked by swinging of the lower louver, the fitting between the fitting shaft portion of the lower rotary link member and the fitting portion of the lower louver is released, and the coordination between the variable louver and the lower louver is interrupted to permit swinging of the lower louver.

4. The variable duct apparatus according to claim 1, wherein the link base portion is rotated in a vertical direction of the vehicle, and a drive force caused by the rotation is transmitted to each of the upper link and the lower link.

5. The variable duct apparatus according to claim 2, wherein the link base portion is rotated in a vertical direction of the vehicle, and a drive force caused by the rotation is transmitted to each of the upper link and the lower link.

6. The variable duct apparatus according to claim 1, wherein the lower link arm includes a lower link arm engaging portion integrally formed with the blocking surface so as to comprise the lower louver.

7. The variable duct apparatus according to claim 1, wherein the lower link arm has side portions which bend downwards from opposite ends of the upper portion of the lower link arm and extend while being opposed to each other.

8. The variable duct apparatus according to claim 7, wherein the lower link arm has end portions bent from the side portions, respectively, in a direction toward each other to form a substantially rectangular shape that is open at the lower portion with the end portions opposed to each other at a predetermined spacing.

9. The variable duct apparatus according to claim 1, wherein the upper link includes an upper first rod and an upper second rod extending in a vertical direction on a side in the forward direction of the vehicle with respect to the variable louver.

10. The variable duct apparatus according to claim 9, wherein a drive shaft is formed on the upper first rod and is connected to a drive receiving portion of the variable louver.

11. The variable duct apparatus according to claim 9, wherein an upper part of the upper second rod is pivoted on a lower part of the upper first rod, and a lower part of the upper second rod is rotatably mounted to the one end of the link base portion.

* * * * *